Dec. 25, 1923. 1,478,706
E. L. FORKER
HINGE PIN
Filed Nov. 4, 1922
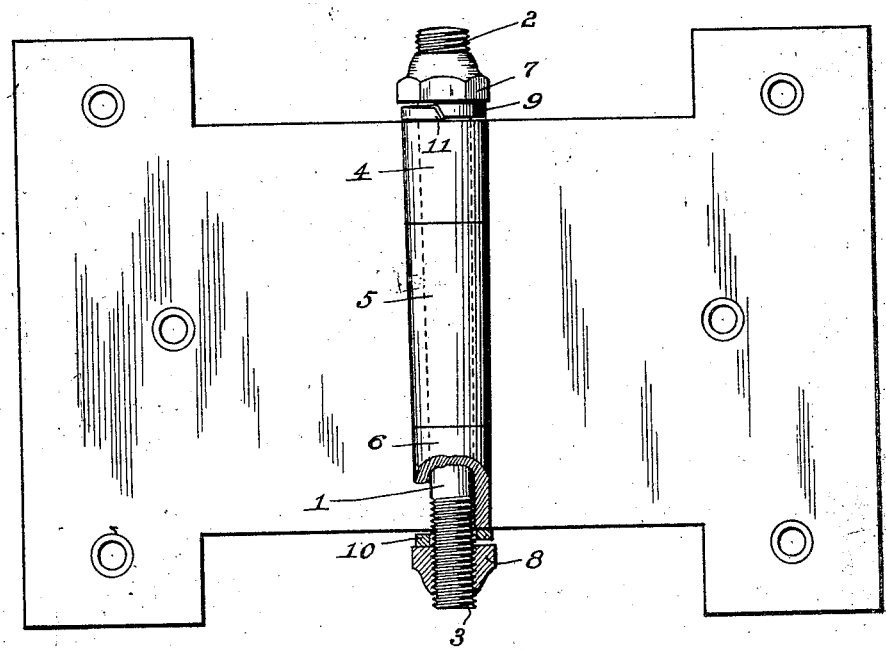
Inventor;
Edwin L. Forker;
per A. K. Martell
Attorney.

Patented Dec. 25, 1923.

1,478,706

UNITED STATES PATENT OFFICE.

EDWIN L. FORKER, OF LOS ANGELES, CALIFORNIA.

HINGE PIN.

Application filed November 4, 1922. Serial No. 599,031.

*To all whom it may concern:*

Be it known that I, EDWIN L. FORKER, a citizen of the United States, residing at Los Angeles, in the county of Los Angeles and State of California, have invented new and useful Improvements in Hinge Pins, of which the following is a specification.

My invention relates to hinge pins, particularly tapered pins; and the objects of my improvements are, first, to provide convenient means for variably adjusting the stiffness of a hinge joint; and, second, to make such adjustment independent of the subsequent motion of said joint.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

This improvement will be particularly useful in connection with casement windows and for doors subjected to strong drafts. In such cases my joint will not only obviate slamming and rattling, but may easily be adjusted to withstand the force of the air currents so as to remain in the desired position but retaining ample flexibility for manual operation.

My objects are attained by the construction disclosed in the accompanying drawing comprising a front elevation of a hinge with my invention applied thereto; and with certain parts broken away and shown in section to more clearly indicate the construction.

The hinge pin 1 is made slightly tapered from top to bottom and is threaded at each end. The upper threaded portion 2 ordinarily is much shorter than the lower threaded portion 3.

The bores of the joint barrels 4, 5, and 6 are also tapered to fit pin 1. If the hinge is made of cast metal, with closed joint barrels, the tapering is necessarily done by reaming. If, on the other hand, the hinge is made of resilient or wrought metal, with formed open joint barrels, the correct type for the respective bores ordinarily can be obtained by driving the tapered pin into them until the metal of the barrels conforms to the taper.

At the ends of the tapered pin I provide ornamental nuts 7 and 8 respectively, and resilient means for keeping the pin tight; said means comprising spring or lock washers 9 and 10 mounted between the respective nuts and the end of the joint barrels.

It will be obvious that, to increase the stiffness of a hinge joint fitted with my invention, it is only necessary to drive the tapered pin farther into the bore of the barrels and to retain it in that position by means of nut 8 and lock washer 10. To accomplish this it may, of course, be necessary to slack back a few turns on nut 7.

To make the joint swing more freely the procedure is the reverse of that just described.

For greater illustrative clearness I have shown nuts 7 and 8 only partially tightened, and lock washers 9 and 10 uncompressed. When the adjustment of the joint is complete the nuts are tightened down and constrain the washers to lie in one plane. The type of lock washer I prefer to use has biting edges, as 11, strongly resisting but not preventing adverse rotation, while freely permitting rotation in the other direction. In this manner nuts 7 and 8 are prevented from being backed off by the movement of the hinge barrels.

The only precaution to be noted is that the adverse handing of the lock washers should correspond to the backing off handing of their respective nuts. If, therefore, both threaded portions of the tapered pin are right handed as shown in the drawing, then the adverse handing of the washers should be left as shown.

It will be apparent that the adjustment of the hinge for joint stiffness is chiefly made by means of nut 8. The upper nut is added largely for appearance, but it also is useful at times when it is desired to ease off the hinge stiffness.

I claim as my invention:

1. A hinge joint comprising interlaced barrel portions having tapered bores and a tapered pin therethrough; said pin being longitudinally positioned with respect to said barrel portions by an axial nut and lock washer.

2. A hinge joint comprising interlaced barrel portions having tapered bores and a tapered pin therethrough; said pin being exteriorly screw threaded at its smaller end and provided with a lock washer and nut engaging said thread.

3. A hinge joint comprising interlaced barrel portions having tapered bores and a tapered pin therethrough; said pin being exteriorly screw threaded at its ends and having lock washers and nuts respectively engaging said threads.

4. A hinge joint comprising interlaced barrel portions having tapered bores and a tapered pin therethrough; said pin being longitudinally positioned with respect to said barrel portions by an axial nut and a resilient washer.

EDWIN L. FORKER.